Oct. 29, 1957     G. MONTI     2,810,958
ROYAL COFFEE MAKING SPOON
Filed April 20, 1955
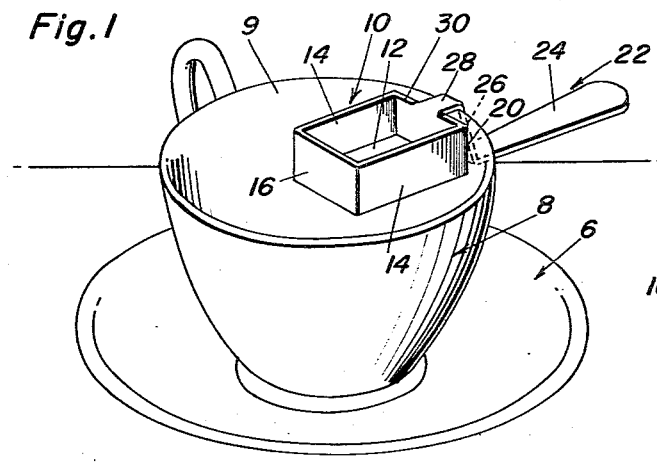
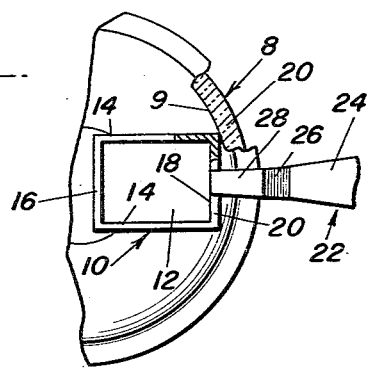
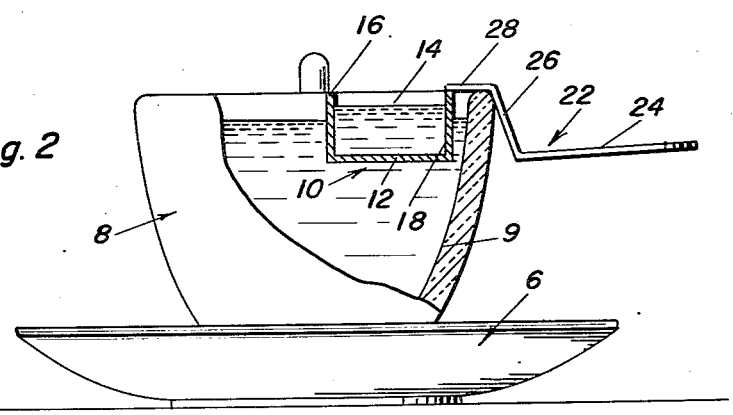
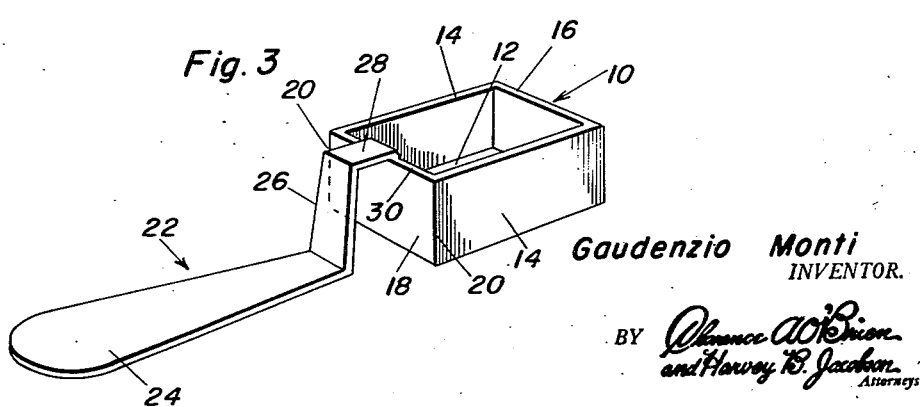
Gaudenzio Monti
INVENTOR.
BY United States Patent Office 2,810,958
Patented Oct. 29, 1957

2,810,958

ROYAL COFFEE MAKING SPOON

Gaudenzio Monti, New York, N. Y.

Application April 20, 1955, Serial No. 502,695

1 Claim. (Cl. 30—327)

The present invention relates to means whereby a user thereof may satisfactorily and expeditiously prepare a popular beverage known by most persons, it is believed, as royal coffee; and it has more particular reference to a specially constructed spoon which enables the user to achieve the wanted result with the utmost in skill and satisfaction.

It will be evident from the foregoing general statement that the object of the invention is, therefore, to provide a special purpose spoon which is expressly well adapted for use in restaurants serving alcoholic beverages, at hotel bars and in the home for persons who resort to the practice of serving their guests a royal coffee.

A genuine royal coffee is prepared, as well known, minus the alcohol. The general procedure is to use an ordinary teaspoon which is charged with the desired or customarily used liquor. Then, a flame is applied to the bottom of the spoon bowl and then to the surface of the liquor in said bowl and this is customarily accomplished by using a lighted match. After the alcohol is "burned out," the contents of the spoon is then dumped into the hot black coffee and stirred and consumed in customary fashion. It is obvious, however, that this procedure of making a royal coffee is slow, undesirably unsanitary, and for that matter, dangerous too.

It is the object of the present invention to provide members of the public with a special kind of a spoon having a handle and a bend fashioned into a hook portion, the latter engageable over the brim of the wall of the cup. The receptacle portion of the spoon is immersed in the hot coffee using the latter as the source of heat for subjecting the whiskey in the spoon to a temperature sufficient to preheat same, after which the flame is applied and alcohol is burned out and the liquor, minus the alcohol, is then dumped into the hot coffee and mixed, as above stated.

In carrying out the preferred embodiment of the invention the spoon is constructed of some lightweight durable material, perhaps stainless steel so that it is not only durable but is easy to keep clean and is non-corrodible.

Other objects, features and advantages will become more readily apparent from the following description and the accompanying sheet of drawings.

In the accompanying sheet of drawings wherein like numerals are employed to designate like parts throughout the views:

Figure 1 is a perspective view illustrating a conventional coffee cup and associated saucer and the improved royal coffee making spoon positioned for use on the rim or wall of the cup.

Figure 2 is a view in section and elevation showing the same assemblage as is depicted in Figure 1.

Figure 3 is a perspective view of the improved spoon by itself.

Figure 4 is a fragmentary top view with portions in section and elevation and which serves to illustrate how the corner portions of the receptacle portion of the spoon rest against the cup rim.

Referring now to the drawings by the aid of reference numerals and accompanying lead lines, the numeral 6 designates a conventional saucer and 8 a conventional coffee cup, the endless wall or rim of which is denoted (Fig. 4) at 9.

The improved royal coffee making spoon is of stainless steel and comprises a lightweight substantially rectangular receptacle 10 of a capacity which may be said to be ample to contain the usual amount of sugar and liquor or whiskey as the case may be. It has a flat bottom 12 and upstanding longitudinal side walls 14 and front connecting wall 16 and rear wall 18. The wall 18 joins with the walls 14 and provides spaced parallel corner portions 20. The integral handle is denoted by the numeral 22 and it embodies a major substantially flat outer end portion 24 which is coplanar with the bottom 12 so that the device may be placed firmly, when not in use on a table or the like (not shown). The junctional connection between said flat portion 24 and receptacle portion may be described as a substantially L-shaped bend and it includes a vertical limb 26 equal in length to the depth of the receptacle and a horizontal limb 28 which latter is connected to the upper edge of the wall 18 midway between the side walls 14. Thus, the two corners 20—20, wall 18 and complemental portions 26 and 28 of the bend provide an attaching and suspending "hook" for the spoon. This hook permits the spoon to be attached to the rim of the cup in the manner shown in Figs. 1, 2 and 4. Figure 4 shows how the two corners 20 rest against the inner surface of the rim 9 for partial support. In other words, it is these two corners 20 and the bends 26 and 28 which actually form the attaching and suspending means for the spoon.

In using my specially designed and therefore unique spoon and with a view toward making a royal coffee, it is to be remembered, as previously stated, that the receptacle portion 10 is large enough to accommodate and successfully hold a lump of sugar and a quantity of liquor or whiskey, for example, a half glass of whiskey. The spoon, th elump of sugar and the liquor are immersed in the hot coffee in the cup with the suspension and retaining means engaged over the rim of the cup as shown in the drawings. As a general rule, it is desirable to wait about fifteen seconds, more or less, to give the liquor (see Fig. 2) time to warm up. Then, when the liquor warms sufficiently a lighted match is applied to the liquor and is held against the surface of the latter until the alcohol is burned out in a generally well known manner. The then sweetened liquor in the receptacle is dumped or poured into the coffee in the cup in a generally obvious and well known manner. The two corners 20—20 and bends 26 and 28 provide not only the attaching and suspending means but also serve to anchor the spoon in the right place and at the desired level while burning the alcohol. The length of the bend 28 is determined by the needs of the manufacturer inasmuch as it is to be kept in mind that since the wall 18 is flat and straight across it actually bridges an arc, placing the two vertical corners 20 into firm abutting contact with the surface 9 as illustrated in Figure 4.

While it is perhaps true that there are spoons available which have a handle and hook means and which are used for other special purposes, none are known to this applicant which are characterized by the rectangular flat bottomed receptacle, handle 22 and the special features 24, 26 and 28 thereof.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

What is claimed as new is as follows:

A spoon for use in making coffee royal comprising a rectangular bowl portion, and a handle having a portion adjacent and attached medially to one of the sides of the bowl portion at the upper edge thereof; said handle portion extending parallel to the top and bottom of the bowl portion for a short distance and then downwardly at right angles thereto parallel to the side portion of said bowl from which the handle is attached for a distance equal to the length of the side portion and then outwardly and away from the bowl portion to form a grasping portion for the hand of the user, said one side portion of the bowl and adjacent parallel portion of the handle providing closely adjacent cooperating surfaces adapted to engage over the rim of a cup and thus wholly support the bowl portion in its usable position without the necessity of retaining hold of the grasping portion of said handle.

References Cited in the file of this patent

UNITED STATES PATENTS

| | | |
|---|---|---|
| 784,830 | Beistle | Mar. 14, 1905 |
| 1,133,026 | Heidelberg | Mar. 23, 1915 |
| 1,273,642 | Margetts | July 23, 1918 |
| 1,619,878 | Morgan | Mar. 8, 1927 |
| 2,072,469 | Scofield | Mar. 2, 1937 |
| 2,099,430 | Quea | Nov. 16, 1937 |
| 2,196,244 | Blomquist | Apr. 9, 1940 |